United States Patent

[11] 3,604,580

| [72] | Inventor | Harold R. Geister<br>511 Francisco Blvd., San Rafael, Calif. 94901 |
|---|---|---|
| [21] | Appl. No. | 886,074 |
| [22] | Filed | Dec. 18, 1969<br>Division of Ser. No. 744,823, July 15, 1968, Pat. No. 3,521,723. |
| [45] | Patented | Sept. 14, 1971 |

[54] TRAILER WITH PORTABLE CONTAINERS
4 Claims, 8 Drawing Figs.

[52] U.S. Cl. .................................................. 214/515,
296/23 MC
[51] Int. Cl. ..................................................... B60p 1/64,
B60p 3/10
[50] Field of Search ........................................... 214/390,
815; 254/45; 296/23 MC, 23

[56] References Cited
UNITED STATES PATENTS

| 3,083,850 | 4/1963 | Owen .......................... | 214/390 |
| 3,255,906 | 6/1966 | Proler et al. ................. | 214/515 |
| 3,490,632 | 1/1970 | McKinney .................... | 214/515 X |
| 3,507,476 | 4/1970 | Bennett ....................... | 214/515 X |

Primary Examiner—Albert J. Makay
Attorney—George B. White

ABSTRACT: A portable cargo container in combination with a generally U-shaped horizontal body frame of a trailer having two spaced parallel longitudinal frame members; the upper section of the container is wider than the space between said longitudinal frame members, and the lower container section is narrower than the space between said longitudinal frame members and is higher than the distance of said longitudinal frame members from the ground level so as to permit the longitudinal frame members to be backed under said upper section for loading; said lower section being adapted to serve as a base to support the container on the ground thereby to eliminate the need for multiplicity of trailers.

PATENTED SEP 14 1971

INVENTOR.
Harold R. Geister
BY George B White
Attorney

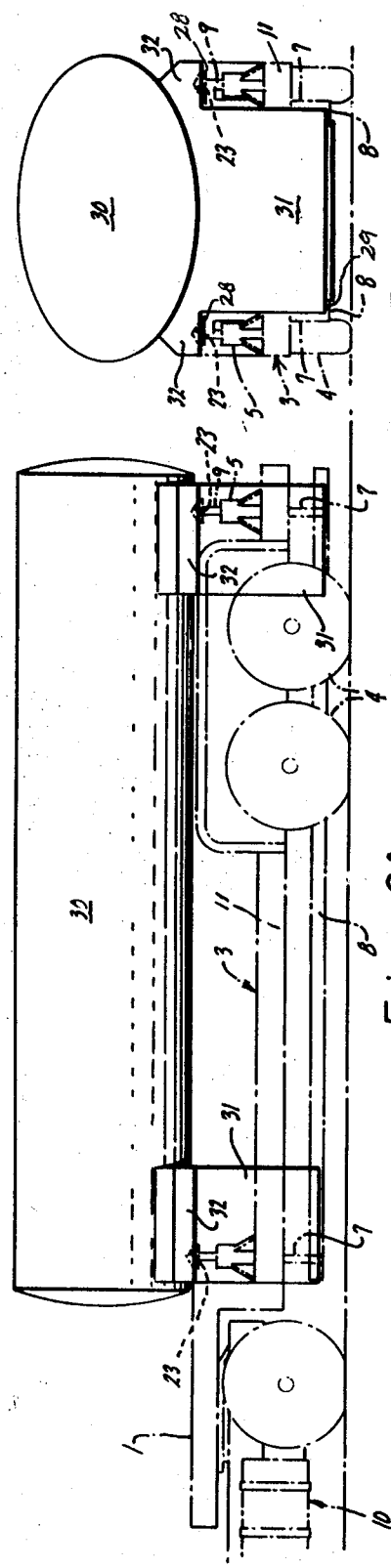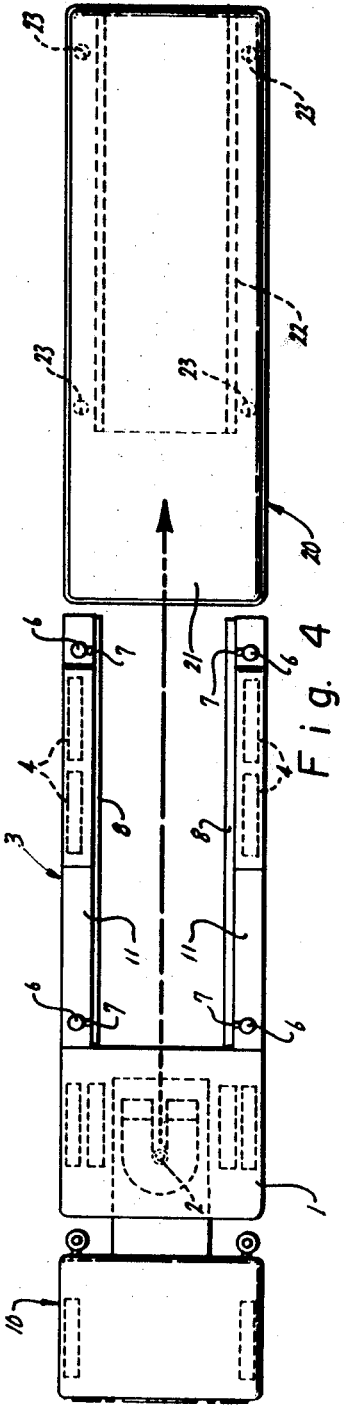

INVENTOR.
Harold R. Geister
BY
George B. White
Attorney

TRAILER WITH PORTABLE CONTAINERS

This is a divisional application of parent application Ser. No. 744,823 filed July 15, 1968 now U.S. Pat. No. 3,521,723.

BACKGROUND OF THE INVENTION

The use of trucks or tractors and trailers in the trucking industry has been practiced for many years. One of the disadvantages is the necessity for providing, maintaining, paying licenses and insurance for a large number of trailers.

Attempts have been made to overcome this problem by providing portable or removable containers for cargo or loads which may be placed upon or removed from a single trailer and left in position for loading or unloading while the truck or trailer engages in other work.

All of these are attended by many disadvantages. Among these are the necessity for heavy and expensive lifting equipment, the need for special means of support for the container during the loading and unloading and the consequent necessity for extra labor which is involved in the use of the existing types.

Existing devices are likewise limited in their capacity and are lacking in flexibility insofar as type of cargo which may be handled.

It is therefore a general object of my invention to provide a trailer and container combination which would provide for greater flexibility and ease of operation than those now in use.

It is another object of my invention to provide a container for a trailer which would have a greater capacity than those now in use.

It is a more specific object of my invention to provide a device in combination with a trailer which would enable easy loading of the container upon a trailer, holding it in position while in transporting and removing it for unloading at the destination.

It is finally an object of my invention to provide a cargo container for use with a trailer which would permit extreme ease of loading and unloading after the container is removed from the trailer.

SUMMARY

My invention comprises essentially the use of a container having a generally T-shaped cross section. This permits the use of my novel hydraulic device for raising the container from the ground up upon the trailer. For this purpose I use a series of hydraulic cylinders or jacks mounted on a trailer frame or body. These are equipped with the usual hydraulic plungers but employ a novel combination of an adapter which works upon the wide ends of the T and at the same time raises the narrow or straight portion of the T. In this manner I am able to use a container having a larger cross-sectional area and hence volume. This device and combination also insures stability of the container while in transit. Probably one of the biggest advantages is that the container itself needs no auxiliary legs or other devices to perform the operation of loading and unloading from the trailer as is true on present devices.

My invention is also quite flexible in that it is adapted to liquid, bulk, and other types of cargo carriers without any basic changes in construction.

DESCRIPTION OF DRAWINGS

FIG. 4 is a diagrammatic top view of the tractor-trailer of FIG. 1.

FIG. 6A and 6B show the application of my invention to tank containers for transportation of fluids.

DESCRIPTION OF A PREFERRED EMBODIMENT

Figure 1:
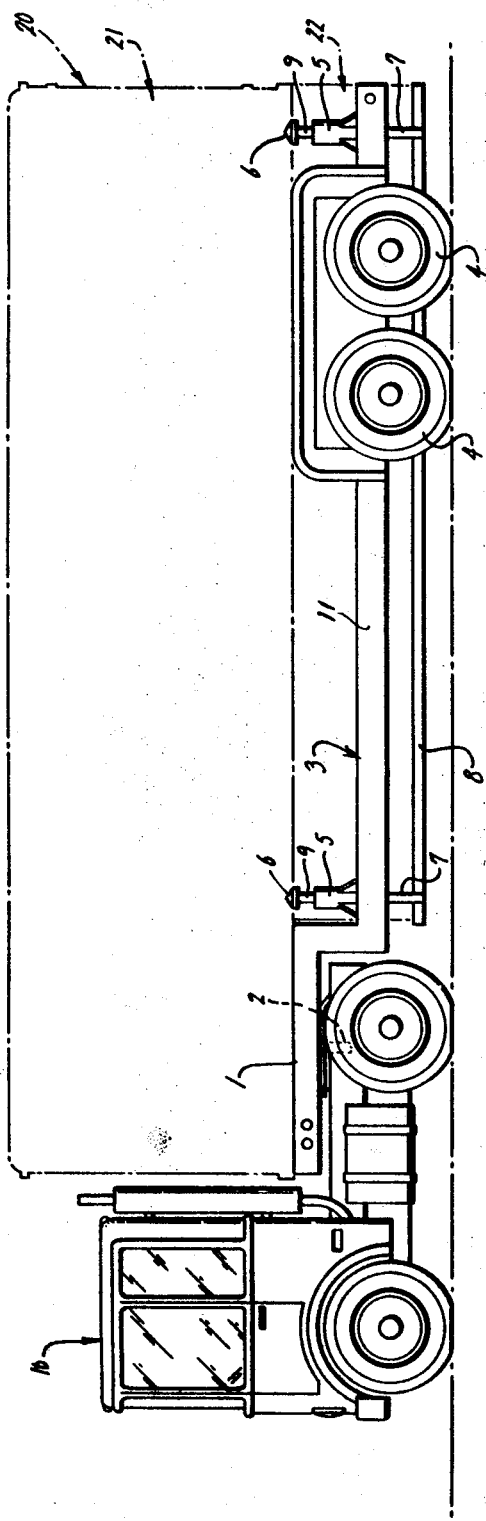
FIG. 1 is a side elevation of the tractor in combination with the trailer of my invention.
Figure 2:
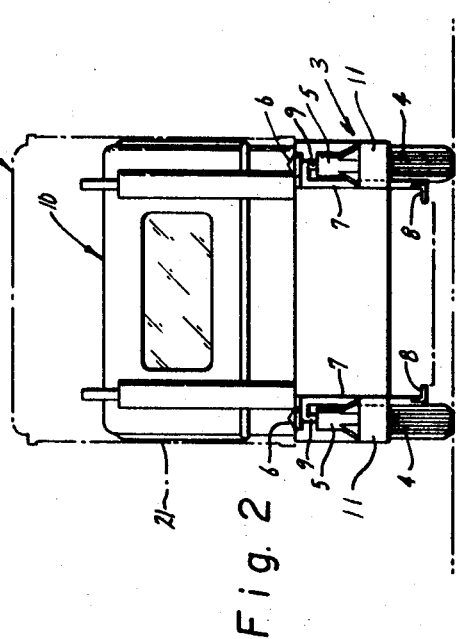
FIG. 2 is an end view showing partly the hydraulic cylinders and shoe combinations of my invention.

Referring to the FIGURES, and particularly at preset to FIG. 1, and FIG. 2, there is seen the conventional trailer body 1 with connecting links and pins 2. The body 1 has an underslung frame 3 and rear wheels 4 mounted on a body frame and hydraulic cylinders 5. In the embodiment shown the plungers 9 of these cylinders are equipped with a conical engaging member 6 for engaging the lower surfaces of the container as will be described more fully below. Toe member 7 is of L-shaped configuration and engages plunger 9 at its upper end and engages the horizontal shoes 8 at its lower end which in turn engage the lower edges of the container as will also be described below. The truck or tractor section 10 is of the conventional type except that it contains the mechanism for supplying fluid pressure to the hydraulic cylinders 5. This is not shown in the drawings. The body frame 3 is substantially U-shaped with spaced longitudinal frame members 11 open at the rear end of the trailer frame 3.

Figure 3:
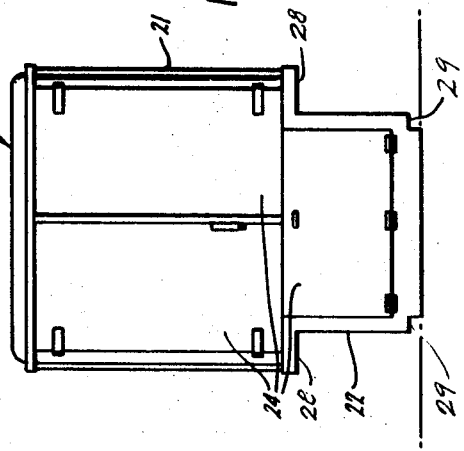
FIG. 3 is a cross section through the container of my invention.
Figure 5:
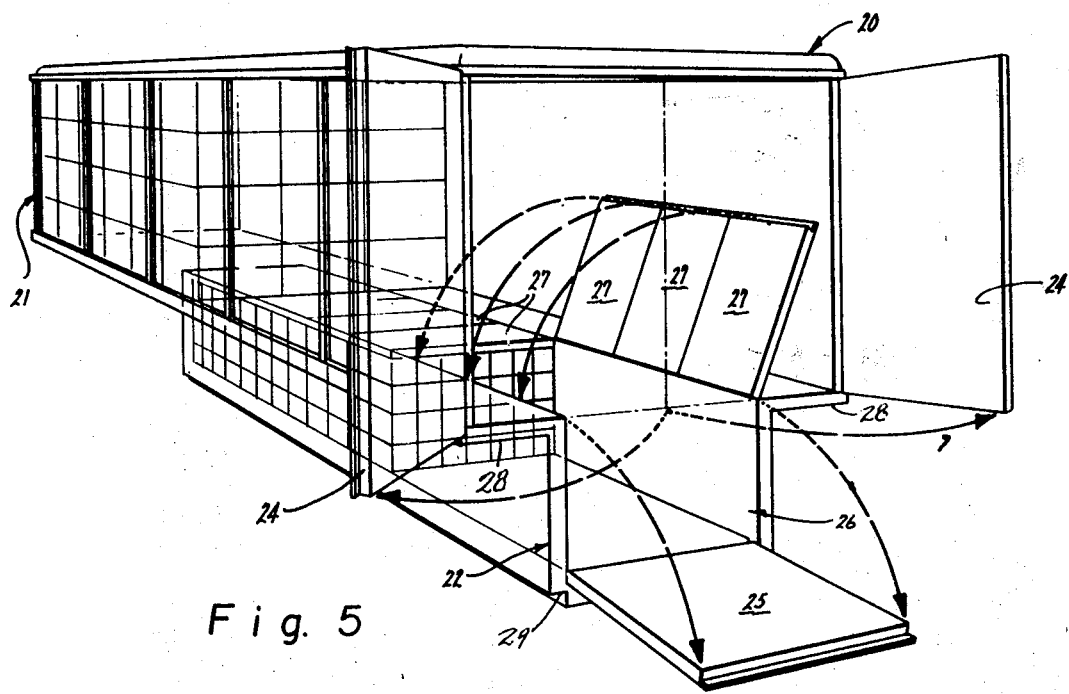
FIG. 5 is a phantom isometric view of a container showing the advantageous loading features.

Referring now more particularly to FIG. 3 and FIG. 5, there are seen two views of a typical container of my invention. The container body itself 20 comprises an upper section 21 and a lower section 22 having a narrower width, but capable of receiving cargo. The sockets 23, which are of conical configuration, are adapted for receiving the ends 6 of plungers 9. The body of the container is further equipped with vertically hinged loading doors 24 and a horizontally hinged loading door 25. When the latter is in an open position as shown, it provides a ramp upon which a loading truck such as a fork lift truck may gain access to the interior of the container. The latter is made further accessible by use of the hinged floor 27 which comprises essentially a series of trap doors separating the upper portion 21 from the lower portion 22 of the container.

The upper container section 21 is wider than the space between the longitudinal frame members 11. The lower container section 22 is narrower than the space between said frame members 11 so as to form longitudinal shoulders 28. The socket 23 are in the shoulders 28. The lower container section 22 has longitudinal ledges 29 near its bottom for engagement by the shoes 8.

OPERATION

The operation employing my invention may be summed up briefly as follows:

The container 20 may first be assumed to be located at a warehouse or other place from which it is sought to transport cargo. This container, of course, may be left at this location for a prolonged period of time and requires no great maintenance or first cost and, of course, no license or insurance as a vehicle. The cargo, depending upon its nature, is loaded into the interior in a manner described above or in any other convenient manner and the doors secured. When it is time for the shipment to be made, the truck and trailer arrives and the trailer is backed in under the container. The longitudinal frame members 11 are arranged so that they straddle the lower section 22 of the container and the trailer is maneuvered in position so that the engaging member 6 of the hydraulic cylinders 5 are in position to engage the recesses or sockets 23 under the shoulders 28. Fluid pressure is then supplied to the hydraulic cylinders 5, raising the plungers 9 and engaging the recesses or sockets 23. At the same time, and this is a very important feature, the shoes 8 engage the lower ledges 29 of the bottom section 22. The combined action of the engaging members 6 and the shoes 8 is such that it raises the container upwards and at the same time maintains its lateral stability. This is continued until the proper elevation is attained, whereupon the container is held in this position by the aforesaid combined action and is ready for transportation. When the destination is reached the above process is reversed and the container left for unloading at the convenience of the receiver. It is thus evident that this transportation may be effected with a minimum exercise of manpower and without the need of any equipment or devices other than those provided by my invention which form a part of the trailer.

I have discovered also that my invention may be used advantageously for different types of cargo. Thus referring now more particularly to FIGS. 6, 6A and 6B, there is shown a fluid container 30 supported on block supports 31. In this case the T-configuration is supplied by lifting wings 32 in which are located the lifting sockets or recesses 23 for receiving the engaging members 6 as described above. Otherwise the operation is exactly like that in the case of the solid cargo container described above.

Figure 7:
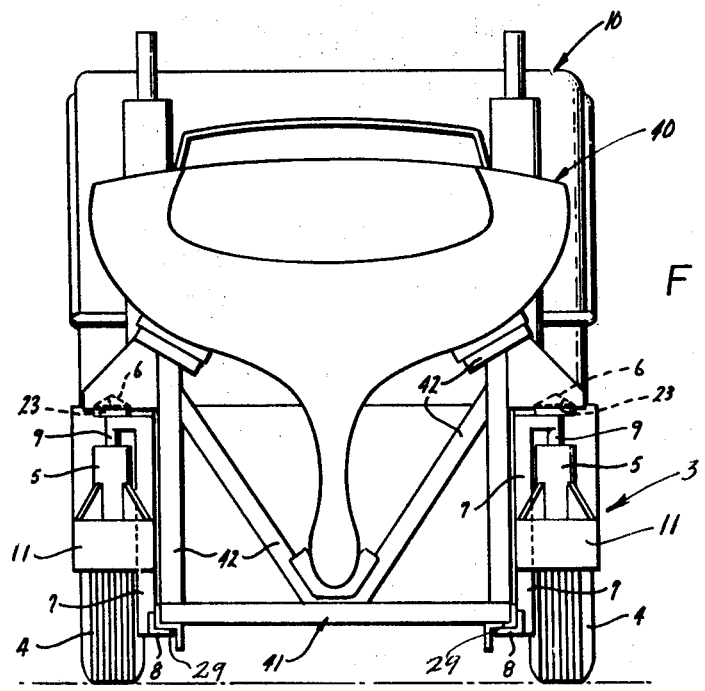
FIG. 7 shows the application of my invention to the transportation of boats and similar objects.

For transportation of boats or similar objects I may use the embodiment shown in FIG. 7. Here there is seen a cross section of a boat 40 held in a cradle or platform supports 41 and 42. In this embodiment I may or may not use lifting wings depending on the stability of the object, but I do employ my toe members 7 and shoes 8 in a manner similar to that described for my cargo container above.

I claim:

1. A portable cargo container for use with a trailer, having a body frame with two parallel spaced longitudinal sections open at its rear end and container lifting means on said longitudinal sections, said container being characterized by:

an upper section having a width at least equal to that of said body frame thereby to overlap said longitudinal sections, a lower section capable of containing cargo and having a width substantially less than that of said upper section and less than the spacing between said longitudinal sections thereby forming longitudinal shoulders engageable with said longitudinal sections and said lifting means, said trailer being disposed to straddle said lower section of said container between said longitudinal sections while permitting said upper section to rest upon said longitudinal sections, said upper section and said lower section of said container being separated by a floor comprising a plurality of trap doors, said lower section having a vertical rear end wall, a lower horizontal edge on said end wall, said edge including a ramp for access to said container when said end wall is opened.

2. The combination of claim 1, and the height of said lower section being greater than the distance of said longitudinal frame sections from the ground level to permit the backing of said longitudinal sections and said lifting means under said shoulders when said lower section rests on the ground.

3. The combination of claim 2, and longitudinal ledges formed on said lower section spaced from the bottom thereof to form additional lifting support.

4. The combination of claim 2, wherein said container consists of a support frame.